United States Patent
Maier

(10) Patent No.: US 11,812,089 B2
(45) Date of Patent: Nov. 7, 2023

(54) REMOTE CONTROL FOR ACTIVATING A PREDETERMINED FUNCTION

(71) Applicant: FM MARKETING GMBH, Neumarkt am Wallersee (AT)

(72) Inventor: Ferdinand Maier, Neumarkt am Wallersee (AT)

(73) Assignee: FM MARKETING GMBH, Neumarkt am Wallersee (AT)

( * ) Notice: Subject to any disclaimer, the term of this patent is extended or adjusted under 35 U.S.C. 154(b) by 0 days.

(21) Appl. No.: 17/694,202

(22) Filed: Mar. 14, 2022

(65) Prior Publication Data
US 2022/0201353 A1 Jun. 23, 2022

Related U.S. Application Data

(63) Continuation of application No. PCT/IB2020/058529, filed on Sep. 14, 2020.

(30) Foreign Application Priority Data

Sep. 13, 2019 (DE) ...................... 10 2019 124 764.0

(51) Int. Cl.
*H04N 21/422* (2011.01)
*H04N 21/41* (2011.01)

(52) U.S. Cl.
CPC . *H04N 21/42221* (2013.01); *H04N 21/41265* (2020.08); *H04N 21/42227* (2013.01)

(58) Field of Classification Search
CPC ....... H04N 21/42221; H04N 21/41265; H04N 21/42227
See application file for complete search history.

(56) References Cited

U.S. PATENT DOCUMENTS

| 2013/0005250 A1* | 1/2013 | Kim ................. H04N 21/41265 455/41.1 |
| 2014/0300827 A1 | 10/2014 | Gold-Gavriely et al. |
| 2018/0068555 A1* | 3/2018 | Su ..................... H04N 21/42204 |
| 2018/0352294 A1 | 12/2018 | Compton |

FOREIGN PATENT DOCUMENTS

WO 2016085436 A1 6/2016

OTHER PUBLICATIONS

International Search Report of PCT/IB2020/058529.
Written Opinion of PCT/IB2020/058529.

* cited by examiner

*Primary Examiner* — Randy A Flynn
(74) *Attorney, Agent, or Firm* — Dragon Sun Law Firm, PC; Nathaniel Perkins

(57) ABSTRACT

The invention relates to a remote control for activating a predetermined function of a multimedia converter, in particular a set-top box, by means of a predetermined command, including: a keypad for entering the predetermined command by a user, a signal processing unit for converting the entered predetermined command into control data suitable to activate the predetermined function of the multimedia converter, and a transmission interface for transmitting the control data to the multimedia converter, characterized by a further data receiving interface different from the keypad for receiving setup data of a further device different from the multimedia converter, wherein the data receiving interface is arranged to configure the signal processing device and/or the multimedia converter in dependence on the setup data.

12 Claims, 6 Drawing Sheets

REMOTE CONTROL FOR ACTIVATING A PREDETERMINED FUNCTION

CROSS-REFERENCE TO RELATED APPLICATIONS

This application is a bypass continuation application of PCT application no.: PCT/IB2020/058529. This application claims priorities from PCT Application No. PCT/IB2020/058529, filed Sep. 14, 2020, and from the German patent application 10 2019 124 764.0 filed Sep. 13, 2019, the contents of which are incorporated herein in the entirety by reference.

TECHNICAL FIELD

The present invention relates to a remote control for activating a predetermined function of a multimedia converter, and to a method for setting a control of a multimedia converter controllable by a remote control.

BACKGROUND

From US 2014/0 152 899 A1, a remote control for activating a predetermined function of a set-top box by means of a predetermined command is known, comprising a keypad for entering the predetermined command by a user, a signal processing device for converting the entered predetermined command into control data suitable for activating the predetermined function of the multimedia converter, and a transmission interface for sending the control data to the multimedia converter.

It is object of the invention to improve the known remote control.

SUMMARY

The task is fulfilled by the characteristics of the independent claims. Preferred embodiments are the subject matter of the dependent claims.

In accordance with one aspect of the invention, a remote control for activating a predetermined function of a multimedia converter, in particular a set-top box, by means of a predetermined command comprises a keypad for entering the predetermined command by a user, a signal processing device for converting the entered predetermined command into control data suitable for activating the predetermined function of the multimedia converter, and a transmission interface for sending the control data to the multimedia converter. According to the invention, the remote control comprises a further data receiving interface different from the keypad for receiving setup data of a further device different from the multimedia converter, wherein the data receiving interface is arranged to configure the signal processing device and/or the multimedia converter in dependence on the setup data.

The specified remote control is based on the system of the remote control mentioned at the beginning, in which the multimedia converter to be controlled detects the user via a radio link to a cell phone and is thus personalized. A disadvantage of this method, however, is a signaling effort required for error-free data transmission. On the one hand, the multimedia converter has to receive the control data from the remote control and the personalization data from the cell phone at the same time at certain points in time—such as when it is switched on. On the other hand, it cannot process the data at the same time, and must therefore ensure that it is processed in a predetermined sequence after all.

Here the specified remote control provides the suggestion not to send the personalization data and thus the setup data directly to the multimedia converter to be controlled. Instead, it is sent via the remote control, which can thus ensure that control and personalization data do not arrive at the multimedia converter at the same time, thus reducing the amount of signaling required.

In an embodiment of the specified remote control, the setup data are set up to identify the user. The identification of the user, which is necessary, for example, for the personalized structure of a menu, and thus basically represents a part of the control of the multimedia converter, is thus not carried out from the point of view of the multimedia converter from a third-party source, such as the cell phone mentioned above. Rather, the entire control can be performed via a single control source in the form of the specified remote control.

In a particular embodiment, the setup data comprises an identifier that is part of a communication protocol by means of which the further data interface is set up for communication. Such identifiers can be, for example, an IP address, a MAC address, a Bluetooth address or the like, which may not directly identify the user but only his device uniquely. However, the user can then be easily assigned to the identifier.

In a particular embodiment, the communication protocol is selected according to the transmission standard Near Field Communication, also called NFC. The NFC transmission standard offers the great advantage that the communication partners only communicate with each other over a very short range. The remote control and a mobile communication device, such as the cell phone mentioned at the beginning, must therefore be arranged very close to each other in order to be able to exchange the setup data with each other. In this way, it is effectively avoided that a randomly passing third party with a mobile communication device, which is also known to the multimedia converter for personalization, is mistakenly used as a basis for personalization.

The setup data may include user identification data, as discussed above, to personalize the function of the multimedia converter. Alternatively or additionally, the setup data may include control data based on which the signal processing device of the remote control may configure the specified remote control and/or multimedia converter.

According to another aspect of the invention, a method for setting a control of a multimedia converter controllable by a remote control, in particular a set-top box with a mobile communication device comprises the steps of:
  establishing a short-range radio communication link between the mobile communication device and the remote control,
  sending setup data via the established short-range radio communication link, with which the multimedia converter is controlled as a function of the received setup data.

In a further embodiment of the specified method, the setup data is at least partially entered on the cell phone by a user.

In an additional embodiment of the specified method, the setup data is arranged to configure the remote control and/or the multimedia converter in a user-specific manner.

In a particular further embodiment of the specified method, the setup data is arranged to individualize the remote control in dependence on the mobile communication device.

According to a further aspect of the invention, a control device is set up to implement one of the specified methods.

In a further embodiment, the specified device has a memory and a processor. The specified method is saved in the memory in the form of a computer program, and the processor is provided for executing the method when the computer program is loaded from the memory into the processor.

According to another aspect of the invention, a computer program comprises program code resources for executing all the steps of the specified method when the computer program is executed on an electronic device or one of the specified devices.

According to another aspect of the invention, a computer program product contains a program code which is saved on a computer-readable data carrier, and which carries out the specified method when it is executed on a data processing device.

BRIEF DESCRIPTION OF THE DRAWINGS

The above-described properties, features and advantages of this invention, as well as the manner in which they are achieved, will become clearer in connection with the following description of the embodiments, which are explained in more detail in connection with the drawing, in which.

DETAILED DESCRIPTION

Figure 1:
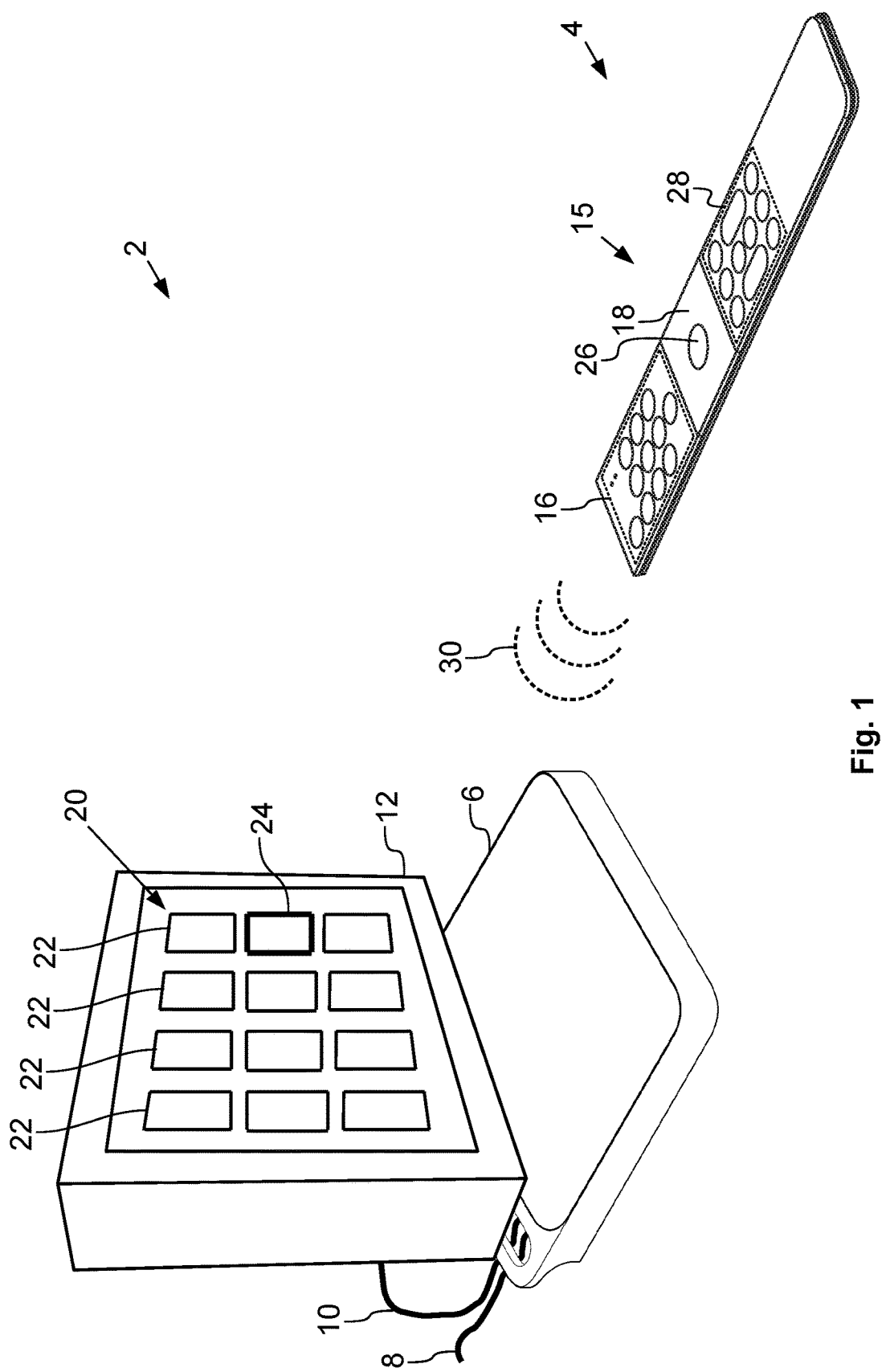
FIG. 1 is a presentation of a system from a remote control and a multimedia converter, which can be controlled by the remote control.

In the drawings, the same technical elements are provided with the same reference signs, and are only described once. The drawings are purely schematic and, in particular, do not reflect the actual geometric proportions.

Figure 2:
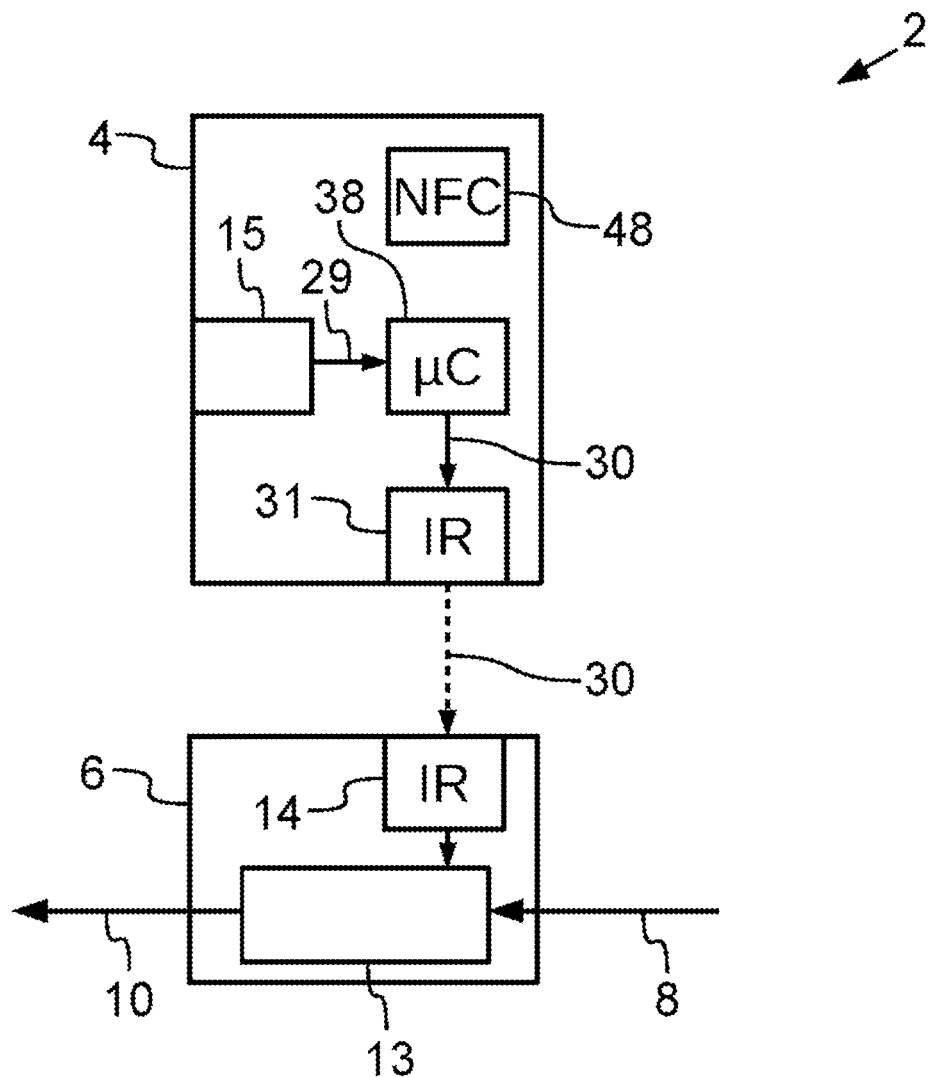
FIG. 2 is a schematic representation of the system from FIG. 1.

Reference is made to FIGS. 1 and 2 showing a schematic representation of a system 2 from a remote control 4 and a multimedia converter 6.

The function of the multimedia converter 6 is to convert an input signal from a multimedia data source, such as an antenna, a network connection, or a data storage device in which multimedia data is described in a format suitable for transmission and/or storage, into an output signal in which the multimedia data is described in a format suitable for playback. In principle, the multimedia converter 6 can be any device, such as a CD player, a HIFI receiver, or a television set.

The multimedia converter 6 is connected to the aforementioned multimedia data source via an input cable 8 and to a playback device 12, here in the form of a television set, via a connection cable 10. In principle, the playback device 12 may also be part of the multimedia converter 6.

In the present embodiment, the multimedia converter 6 is designed as a set-top box, also referred to as an accessory device. The multimedia converter 6 has a data processing device 13, known per se, which receives a digital video broadcasting signal called a DVB signal via the input cable 8, in which digital multimedia contents of various media companies are included. The set-top box 6 is furthermore provided with a receiving interface 14 for the remote control 4, via which a user can control the data processing device 13 and select one of the digital multimedia contents from the aforementioned DVB signal.

Depending on the user's selection, the multimedia converter 6 sends a video signal containing the selected digital multimedia content to the playback device 12 via the connection cable 10 and plays it back to the user. In the present embodiment, the receiving interface 14 is an infrared interface called an IR interface. Alternative embodiments, such as a Bluetooth Low Energy interface, are also conceivable.

To control the playback of the multimedia content, the remote control has a keypad 15 on its upper side, on which various types of control keys are located. For the sake of clarity, the control keys are grouped into key groups in this description. With a program key group 16, which is outlined with a dashed line in FIG. 1, a user can directly select multimedia contents from individual media companies. For this purpose, the user usually enters a numerical code via the program key group 16, which in turn is assigned to a media content of a multimedia company. Furthermore, the remote control 4 has a control pad 18 that allows the user to navigate through a menu 20 displayed by the multimedia converter 6 on the playback device 12.

The menu 20 is composed of various menu items 22, which are generally arranged in a grid pattern. However, other arrangements of the menu items 22 are also conceivable, such as are known, for example, from the publication EP 0 888 687 A1. In FIG. 1, for the sake of clarity, not all menu items 22 are given their own reference signs. Each menu item 22 is assigned a function that can be selected by the user. For example, each menu item 22 may allow one of the above-mentioned media contents of a multimedia company to be selected.

For navigation, a navigation element 24 is displayed to the user, which is placed in a frame around one of the menu items 22. The user moves the navigation element 24 back and forth between the individual menu items 22 using the control pad 18. If the navigation element 24 is located on a menu item 22 desired by the user, the user selects the function behind the menu item 22 by pressing an input key 26 arranged centrally in the control pad 18.

Finally, there are setting control keys on the remote control, which are also combined into a setting key group 28 with a dashed line in FIG. 1. Settings on the multimedia converter 6 and/or the playback device 12 can be made via the setting key group 28.

The previously mentioned distribution of the keys on the remote control 4 is only shown as an example. In principle, the user can enter commands 29 by pressing the keys on the keypad 15 to activate desired functions of the multimedia converter 6 and/or the playback device 12.

To activate a desired function, a signal processing device 38 in the remote control 4 converts a command 29 received via the keys on the remote control 4 into a signal 30 carrying control data and, in the present embodiment, sends the signal 30 via a transmission interface 31 to the set-top box 6, which then activates the function desired by the user based on the control data. The signal 30 carrying the control data can in principle be transmitted in any way, but must be transmitted in such a way that the receiving interface 14 of the multimedia converter 6 can receive and evaluate it. Therefore, the transmitting interface 31 in the present embodiment is designed as an infrared interface.

The operation of the multimedia converter 6 can be adapted, i.e. personalized, by the user to his or her personal preferences. One of many different options for personalization would be to arrange the above numeric codes in a personalized order. For example, in a family, children may wish to assign multimedia content tailored to children to the lowest possible numeric codes in order to select it as quickly as possible. In contrast, adults have no interest in assigning low numeric codes to such content because they hardly ever consume this multimedia content.

US 2014/0 152 899 A1 proposes, for personalization of the set-top box 6, to equip the set-top box with another transceiver through which data can be received from the user's mobile communication device and personalization can be performed.

However, this form of personalization is suboptimal because the data processing device 13 of the multimedia converter 6 must simultaneously synchronize two signals, namely the signal 30 carrying the control commands and a signal carrying the personalization information. In contrast, in the present embodiment, the remote control 4 receives the personalization information from the mobile communication device and forwards it to the multimedia converter 6. In other words, the remote control 4 is used as a gateway between the multimedia converter 6 and the mobile communication device.

Figure 3:
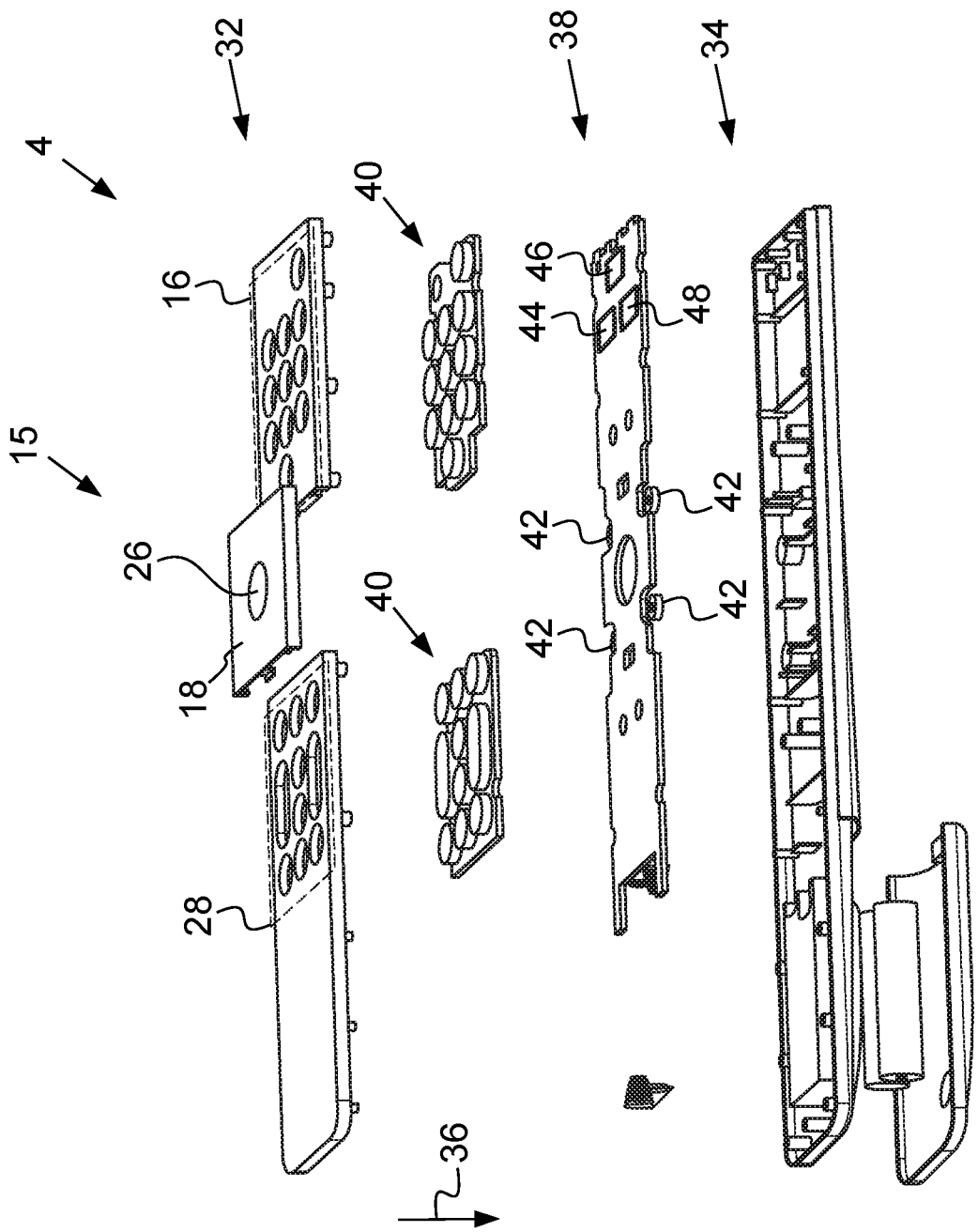
FIG. 3 is an exploded view of a remote control, which can be configured by a mobile communication device.
Figure 4:
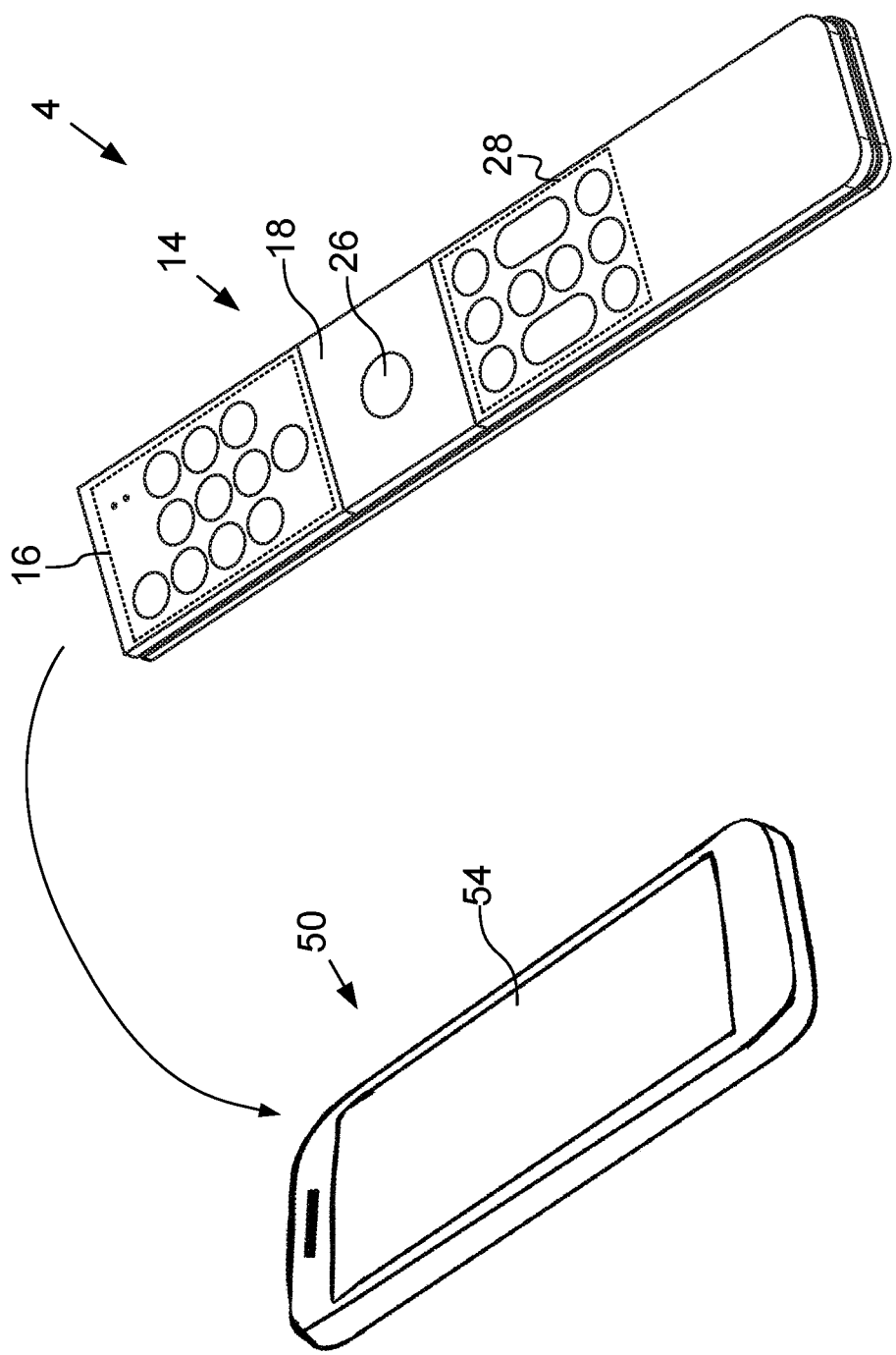
FIG. 4 is a presentation of the remote control from FIG. 3 with a mobile communication device.

This is described in more detail below with reference to FIG. 3, which illustrates the interior of the remote control 4 in an exploded.

The remote control 4 is composed of an upper shell 32 and a lower shell 34, which are placed and fixed on top of each other as seen in a height direction 36. Mechanical details of the fastening are not important for understanding the design. However, they can be found in EP 3 378 082 A1.

Between the upper shell 32 and the lower shell 34, the signal processing device 38 is held here in the form of a printed circuit board. Key mats 40 are carried on the signal processing device 38, which implement the keys of the two key groups 16, 28. When a user presses a key on the key mat 40, a contact is made on the signal processing device 38 in a manner known per se, so that the pressed key of the key mat 40 can be read out on the signal processing device 38. The commands 29 then result from the generated contact or from a combination of multiple generated contacts.

In contrast, the control pad 18 is designed as a plate movable in the height direction 36, at the corners of which magnets 42 are held. The magnets 42 serve as encoder elements for magnetic field sensors on the signal processing device 38, with which the height position of the corners of the control pad 18 on the one hand and the total height position of the control pad 18 for the actuation key 26 on the other hand can be read out. A command 29 entered via the control pad 18 therefore results from one of the detected height positions or a combination thereof. The technical relationships are illustrated in EP 3 378 082 A1 and will not be mentioned again here.

A control chip 44 is provided on the signal processing device 38, which evaluates commands 29 entered via the key groups 16, 28 or the control pad 18, and generates command signals therefrom. Furthermore, the printed circuit board 38 includes a transmitter chip 46 that generates the aforementioned signal 30 carrying the control data from the generated command signals and transmits it to the multimedia converter 6.

In the present embodiment, the remote control 4 further comprises another transceiver, here in the form of a near field communication chip, hereinafter referred to as NFC chip 48. The NFC chip 48 enables the remote control 4 to connect to a mobile communication device 50 to exchange with the mobile communication device 50 the data exchanged in US 2014/0 152 899 A1 between the cell phone and the set-top box 6 shown therein.

The mobile communication device 50 includes an input interface in the form of a touch screen 52 and an NFC chip 54 for the intended data connection. To start the aforementioned data exchange with the remote control 4, the remote control 4 can simply be brought close to the mobile communication device 50, as indicated in FIG. 3.

Figure 5:
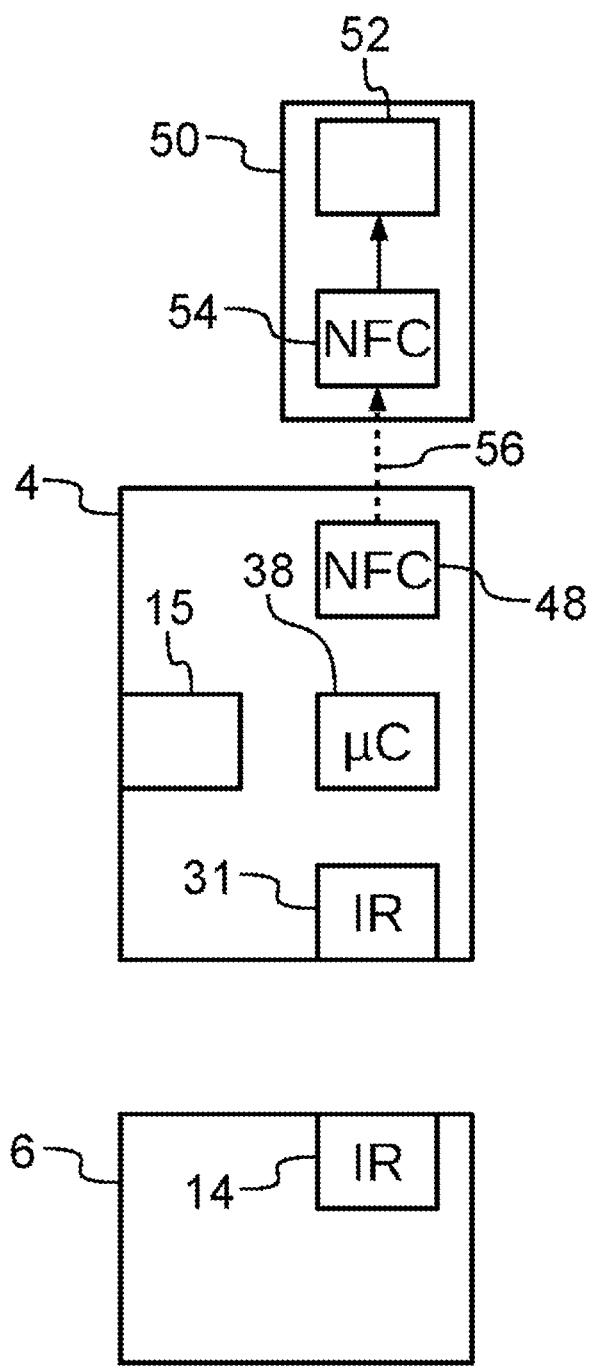
FIG. 5 is a schematic representation of the remote control with the mobile communication device from FIG. 4 in a first state.
Figure 6:
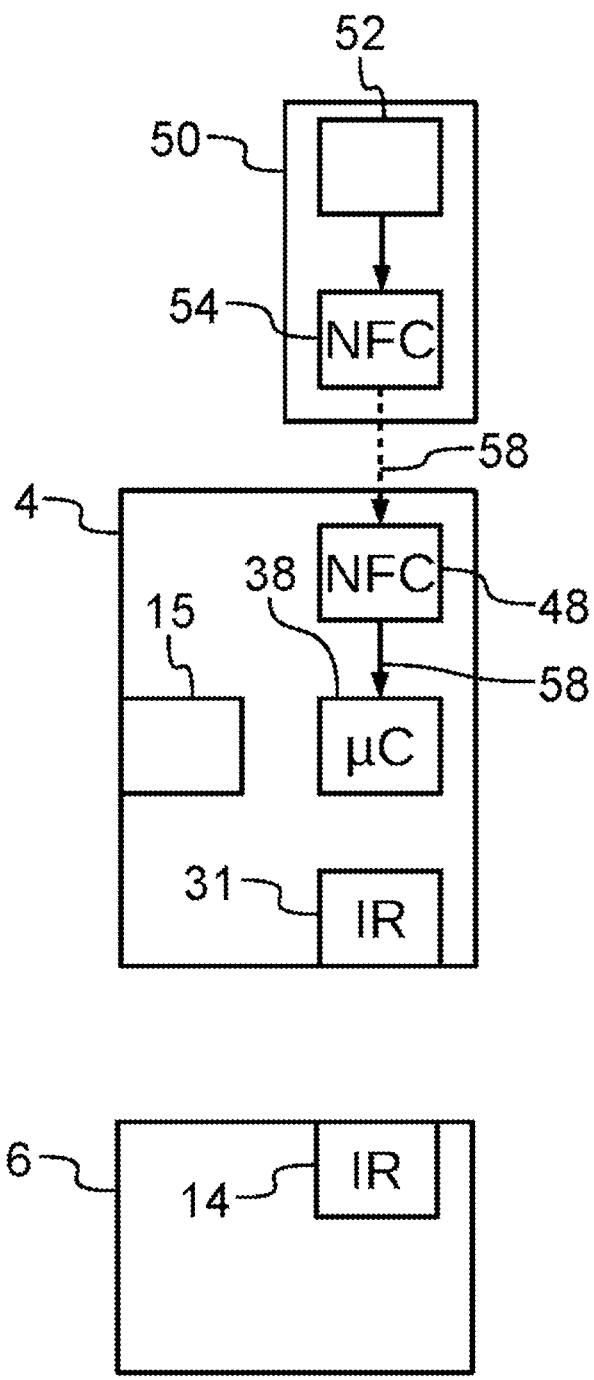
FIG. 6 is a schematic representation of the remote control with the mobile communication device from FIG. 4 in a second state.

The proposed personalization is explained below in detail with reference to FIGS. 5 and 6.

First, the control chip 44 of the remote control 4 detects that the mobile communication device 50 is within radio range, and establishes an NFC communication link 56 between the NFC chip 48 of the remote control 4 and the NFC chip 54 of the mobile communication device 50. The NFC communication link may be established in accordance with, for example, ISO 14443, 18092, and 21481 standards.

Various setup data 58 can now be transmitted from the mobile communication device 50 to the control chip 44 of the remote control 4 via the NFC communication link 56, based on which the multimedia playback of the multimedia converter 6 can be personalized. In the simplest form, an identifier that uniquely identifies the mobile communication device 50 and thus the user can be exchanged as the setup data 58. This can be, for example, a UID called a unique identifier uniquely identifying the NFC chip 54 of the mobile communication device 50, as defined in the standards mentioned above.

The remote control 4 can now transmit the identifier to the multimedia converter 6 in the signal 30 carrying the control data. The transmission of the identifier may be done in any manner. For example, a dedicated transmission in a separate signal or, in the case of packet-oriented transmission, in the header of the individual data packets would be possible. Since all data is sent by the remote control 4, synchronized reception of the individual pieces of information is obsolete.

Particularly preferred, the setup data 58 comprises configuration data on the NFC communication link 56 that can be used to configure the remote control 4 and/or the multimedia converter 6.

For example, the configuration data can be used to arrange the aforementioned numeric codes in the personalized order. For this purpose, a program is executed on the mobile communication device 50 that allows the user to arrange the numeric codes in his preferred personalized order via the touch screen on the mobile communication device 50. Subsequently, the personalized sequence of the numeric codes is sent as configuration data from the mobile communication device 50 to the remote controller 4 via the NFC communication link 56, which in turn sends the personalized sequence of numeric codes to the multimedia converter 6 so that the user can access multimedia content using his personalized sequence of numeric codes.

The personalized sequence of the numeric codes can now be stored in the multimedia converter 6. If the user establishes the NFC communication link 56 again, it is sufficient to transmit only the previously mentioned identifier. The multimedia converter 6 may retrieve the personalized sequence of numeric codes from an internal memory not further shown. Alternatively, the personalized sequence of numeric codes may be transmitted from the mobile communication device 50 each time the user re-establishes the NFC communication link 56. While simply sending the identifier reduces data traffic, constantly resending the personalized sequence of numeric codes avoids incorrectly assigning a user, for example, when two mobile communication devices use the same identifier.

The personalized sequence of numeric codes is only one example of a personalized setting of the multimedia converter 6 and/or the remote control 4. In practice, various settings on the multimedia converter 6 and/or the remote control 4 can be personalized, such as the menu 20. Therefore, the personalized sequence of numeric codes is only an example of personalization of settings on the multimedia converter 6 and/or on the remote control 4, as can be realized by establishing the NFC communication link 56 between the remote control 4 and the mobile communication device 50.

The invention claimed is:

1. A remote control for activating a predetermined function of a multimedia converter, in particular a set-top box, by means of a predetermined command, comprising:
   a keypad for entering the predetermined command by a user,
   a signal processing device for converting the entered predetermined command via the keypad into a signal carrying control data suitable to activate the predetermined function of the multimedia converter,
   a transmission interface for transmitting the control data to the multimedia converter, wherein the signal is configured to be sent via the transmission interface to the set-top box and to activate the predetermined function desired by the user based on the control data, and
   a further data receiving interface different from the keypad and the transmission interface for receiving setup data of a further device different from the multimedia converter, wherein the data receiving interface is arranged to configure the signal processing device and/or the multimedia converter in dependence on the setup data,
   the setup data are set up to identify the user and comprise (1) user identification data, and (2) a portion of the control data based on which the signal processing device configures a specified remote control; the specified remote control does not send the setup data directly to the multimedia converter to be controlled, and the setup data are sent via the specified remote control, thus ensuring that control and personalization data not arriving at the multimedia converter at the same time, and reducing the amount of signaling required.

2. The remote control as claimed in claim 1, wherein the set-up data is defined to identify the user.

3. The remote control as claimed in claim 2, wherein the setup data comprises an identifier that is part of the communication protocol by means of which the further data interface is set up for communication.

4. The remote control as claimed in claim 1, wherein the setup data comprises an identifier that is part of a communication protocol by means of which the further data interface is set up for communication.

5. The remote control as claimed in claim 4, wherein the communication protocol is selected according to the Near Field Communication transmission standard.

6. The remote control as claimed in claim 5, further comprising a transceiver in a form of a near field communication chip, wherein the near field communication chip enables the remote control to connect to a mobile communication device to exchange data between a mobile communication device and the set-top box.

7. The remote control as claimed in claim 1, wherein the signal processing device is arranged to convert the command into the control data in dependence on at least a part of the setup data.

8. The remote control as claimed in claim 1, wherein the transmitting interface is set up to forward at least a portion of the setup data to the multimedia converter for configuration of the multimedia converter.

9. A method for setting a control of a multimedia converter controllable by the remote control as claimed in claim 1, in particular a set-top box with a mobile communication device comprising:
   establishing a short-range radio communication link between the mobile communication device and the remote control, and
   sending setup data via the established short-range radio communication link, with which the multimedia converter is controlled as a function of the received setup data.

10. The method as claimed in claim 9, wherein the setup data is at least partially entered on the mobile communication device by a user.

11. The method as claimed in claim 9, wherein the setup data is arranged to configure the remote control and/or the multimedia converter in a user-specific manner.

12. The method as claimed in claim 9, wherein the setup data is arranged to individualize the remote control in dependence on the mobile communication device.

* * * * *